(12) United States Patent
Rastegar

(10) Patent No.: US 11,031,607 B2
(45) Date of Patent: Jun. 8, 2021

(54) HYBRID THERMAL BATTERY RESERVE POWER SOURCE

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

(*) Notice: Subject to any disclaimer, the term of this patent is extended or adjusted under 35 U.S.C. 154(b) by 692 days.

(21) Appl. No.: 15/060,818

(22) Filed: Mar. 4, 2016

(65) Prior Publication Data

US 2017/0040619 A1 Feb. 9, 2017

Related U.S. Application Data

(60) Provisional application No. 62/129,793, filed on Mar. 7, 2015.

(51) Int. Cl.
*H01M 6/36* (2006.01)
*H02N 2/18* (2006.01)

(52) U.S. Cl.
CPC ............... *H01M 6/36* (2013.01); *H02N 2/18* (2013.01); *H02N 2/181* (2013.01); *H01M 2220/20* (2013.01)

(58) Field of Classification Search
CPC ...... H01M 6/30; H01M 6/36; H01M 2220/20; H02N 2/18; H02N 2/181
See application file for complete search history.

(56) References Cited

U.S. PATENT DOCUMENTS

| 8,550,001 | B2 * | 10/2013 | Rastegar | ................ | F42C 15/24 102/216 |
| 2008/0299447 | A1 * | 12/2008 | Fujiwara | ................ | H01M 6/24 429/103 |
| 2012/0210896 | A1 * | 8/2012 | Rastegar | ................ | F42C 11/02 102/210 |

* cited by examiner

*Primary Examiner* — Stephen J Yanchuk

(57) ABSTRACT

A method for producing power from a thermal battery having a piezoelectric generator. The method including: initiating the thermal battery when the thermal battery experiences a predetermined acceleration event; generating power from the piezoelectric generator when the thermal battery experiences the predetermined acceleration event for at least an initial period after the predetermined acceleration event; and generating power from the thermal battery after the initial period.

10 Claims, 5 Drawing Sheets

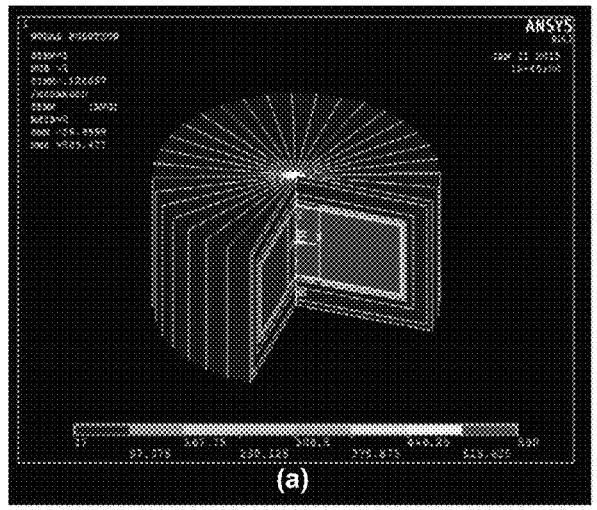
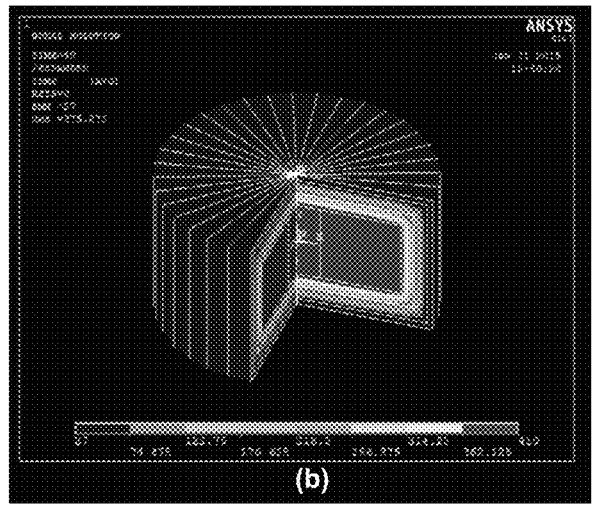
Fig. 3(a)　　　　　　　　　　　Fig. 3(b)
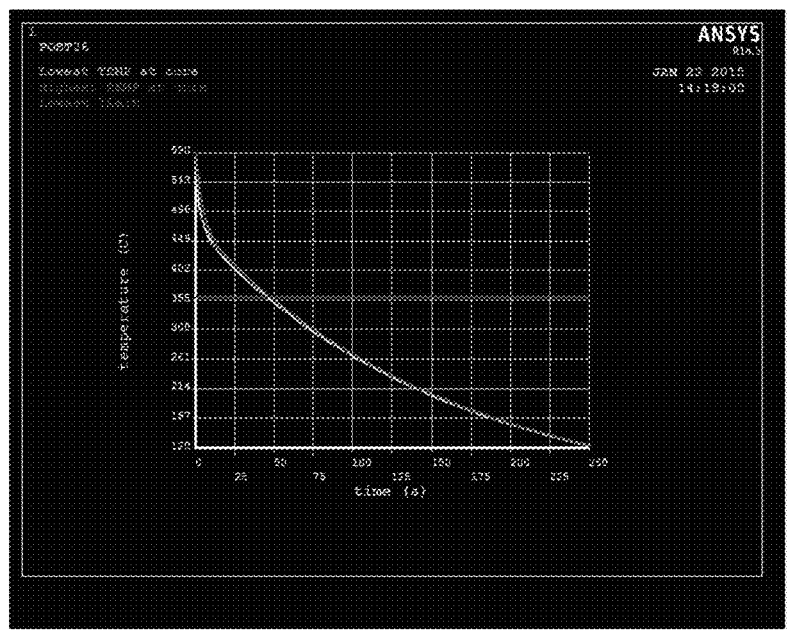
Fig. 4

HYBRID THERMAL BATTERY RESERVE POWER SOURCE

CROSS-REFERENCE TO RELATED APPLICATIONS

This application claims priority to U.S. Provisional Application No. 62/129,793 filed on Mar. 7, 2015, the contents of which is incorporated herein by reference.

BACKGROUND OF THE INVENTION

1. Field of the Invention

The present invention relates to power sources and in particular, to a hybrid thermal battery reserve power source.

2. Prior Art

Thermal batteries are primary reserve electrochemical power sources in which the electrolyte is solid and non-conducting at room ambient temperatures. Upon ignition of an integral pyrotechnic heat source adjacent to each cell, the electrolyte melts and becomes conductive. The battery is then capable of providing power to an external load, as long as the electrolyte stays molten or until depletion of the active material, typically from a few seconds to an hour.

Thermal batteries have many advantages over other battery systems. Since all internal components are immobilized solids at ambient temperatures, the units are inherently rugged. They can withstand severe environments of shock, vibration, acceleration, spin, altitude and temperature. Because they are hermetically sealed they can withstand long term storage, typically well over 20 years, and still provide immediate power upon activation. Thermal batteries are maintenance free and can be permanently installed.

Thermal batteries present an interesting solution given their inherent environmentally and electrically safe design, long shelf life, and zero maintenance. Thermal batteries are therefore a promising technology for fuze power. Thermal batteries have been extensively developed in the United States and represent a stronger industrial base than a liquid reserve battery alternative. While the thermal battery technology presents many advantages as a reserve battery, there are technological challenges impeding their application in some military electrical fuzing applications.

Reserve thermal batteries are a single use, high temperature, galvanic primary cell battery. These batteries have been demonstrated to be environmentally safe and have a long shelf life which is ideal for military purposes. Thermal battery composition allows it to withstand the severe environment of gun ammunition, particularly acceleration, shock, vibration, and spin. They are reliable, safe, have relatively fast activation, do not require maintenance, have chemicals which are inert until activated, and are designed to facilitate power or capacity improvements. The high conductivity of the electrolyte at high temperatures allows the battery to be discharged at high rates. Thermal battery applications and characteristics allow designs to meet specific electrical and environmental parameters. Thermal batteries present a favorable solution given their inherent environmentally and electrically safe design, long shelf life, and zero maintenance for the indicated applications.

The fundamental building block of every thermal battery is the cell. Each cell basically consists of four components: an anode, electrolyte, a cathode and a pyrotechnic heat source. Cells are commonly circular in shape, like coins of various diameters and thicknesses. Once heated to operating temperature, each cell provides approximately 2 volts (lithium compound anode and metal sulfide cathode).

By stacking these cells to form a series cell stack, any desired voltage level is obtained. Electrical connections to external sources are made through battery terminal pins. Internally, these pins are spot welded to metal leads that run along the edge of the cell stack and connect to metal collector discs at each end. Multiple voltage levels can be obtained by inserting collector discs between any cells within the stack. Increasing the cell area, either by enlarging the cell diameter or connecting cell stacks in parallel, increases the battery's ability to meet system current demands. Battery active life is regulated through both quantities of reactive material and thermal management techniques.

They are several ways to activate thermal batteries: the most common activation methods are electrical and mechanical inertial igniters. In each method, the activation device produces a flame or hot particles to ignite the pyrotechnic heat sources located in the battery, thus raising the internal battery temperature to its operating level.

Ammunition fuze electrical requirements vary, such as a nominal voltage of 5.6 to 12 V, current draw of up to 325 mA, runtime of 200 seconds, and a rise time of less than 10 ms with a standard deviation of about 1 ms. Typically, during the first 10 seconds following launch, the fuzing power requirement is lower, such as 35 mA at 5.6 V. During the first 500 msec following launch, the power requirement is even lower, such as 5 mA at 3 V.

For a wide range of munitions power source applications, current thermal battery technology faces a number of significant challenges that need to be addressed. Two of the main challenges facing current thermal battery technology are related to their relatively long rise time and to their relatively short run time for what is usually a relatively small volume requirement, such as 15-20 cubic centimeters.

Thermal battery rise time is directly proportional to its size and is lower for smaller size batteries. However, even for a relatively small battery of 15-20 cubic centimeters in volume, current technology cannot usually achieve the required rise time, such as 10 msec. Thermal batteries are initiated through ignition of their pyrotechnic layers (pyrotechnic heat sources) between the battery cells to provide the heat that is required to melt the battery solid electrolyte. The process of igniting the entire pyrotechnic layers, melting the electrolytes and bringing the battery to its minimum operating temperature level takes a relatively long time. For relatively small batteries, for example on the order of 0.5 to 0.75 inch diameter batteries, the time that will take to bring a current thermal battery, i.e., its rise time, may be at least 50-100 milliseconds.

On the other hand, smaller thermal batteries have a shorter run time due to smaller thermal mass of their battery core (which is proportional to its volume) relative to their surface area through which they lose the stored heat. As a simple example, for cubic battery cores with sides of 1, 2 and 5 inches; their volumes will be 1, 8 and 125 cubic inches, respectively; while their surface areas are 6, 24 and 150, respectively. As a result, the ratio of their surface area to their volume become 6, 3 and 1.2, respectively. This simple example shows why smaller thermal batteries have significantly shorter run time than larger thermal batteries.

Thus, thermal battery rise time is inversely proportional to their size while their run time, which is dependent on maintaining their elevated operating temperature, is directly proportional to their size. For most munitions applications, relatively small size and long run time presents conflicting requirements as the reserve battery is required to rise to operating voltage very quickly and precisely while providing power for the relatively long time of flight. As a result, a large battery that might provide for the flight time would fail the rise time and volume allocation requirement. However, a very small battery might address the rise time and volume allocation requirement but would fail the power run time requirements. Currently, thermal batteries with a volume of 15-20 cubic centimeters cannot be designed to provide electrical power longer than around 50 seconds.

What is needed are reserve power sources that can be designed to provide very fast rise times, such as on the order of 1-10 milliseconds, as well as long run times in relatively small volumes.

SUMMARY OF THE INVENTION

Thus, a configuration of hybrid thermal battery reserve power sources are presented herein that can provide the required nominal voltage of 5.6 V and current of 35 mA in less than 10 msec with a standard deviation of about 1 ms for the first 10 seconds and 325 mA at 5.6 to 12 V for a total run time of 200 seconds.

The reserve power sources presented herein use thermal management and battery packaging to achieve the required long run time within the desired volume (e.g., 15-20 cubic centimeters), such as that disclosed in U.S. Pat. No. 8,061,271, the disclosures of which are incorporated herein by reference. The reserve power sources presented herein have a hybrid design, in which the required early low power level is provided almost instantaneously by a piezoelectric generator in response to the firing shock loading. As a result, the thermal battery will have ample time to activate and provide its required full power. In the hybrid reserve power source configuration, the piezoelectric generator may be provided with full safety and all-fire detection electronic circuitry and logic to ensure that no power is provided to the munitions electronics upon accidental events, such as dropping over hard surfaces, or due to transportation vibrations, such as those disclosed in U.S. Pat. Nos. 8,776,688; 8,286,554; and 8,042,469, the disclosures of which are incorporated herein by reference. The thermal battery may be initiated using a miniaturized inertial igniter, such as those disclosed in U.S. Pat. Nos. 8,875,631; 8,841,567; 8,651,022; 8,550,001; 8,418,617; 8,191,476; 8,061,271; 7,832,335; 7,587,980; 7,587,979; and 7,437,995; the disclosures of which are incorporated herein by reference. Alternatively, the thermal battery may be initiated electrically with an ultra-low power electrical initiator that is powered by the piezoelectric generator, such as those disclosed in U.S. Pat. Nos. 8,776,688; 8,286,554; and 8,042,469, the disclosures of which are incorporated herein by reference.

Thus, the hybrid thermal battery reserve power sources disclosed herein have the following advantages:

1. The piezoelectric component of the power source provides the initial required power almost instantaneously, and well within times required for most munitions, such as within 10 msec, in response to the firing setback shock while the thermal battery is being fully activated.

2. The heat management, consisting of a relatively thin and slow burning pyrotechnic fuse "ribbon" wrapped between insulation layers around the thermal battery core are initiated shortly after the battery activation to provide a continuous source of heat to keep the battery core at its optimal operating temperature for the runtime goal of most munitions, such as for 200 seconds.

3. A method of providing a continuous source of heat to the thermal battery core allows the battery core to be smaller in volume since extra heat mass (larger volume core) is not required for keeping the operating temperature of the battery core above a required minimum threshold.

4. The hybrid power sources can be initiated using firing acceleration or by self-powered electrical initiation devices as dictated by specific mission application needs.

5. Prior to activation, the thermal battery reserve cells remain in a solid state and not subject to self-discharge and power drain or leakage. Shelf (storage) life of the reserve cells exceed typical military requirements, such as twenty (20) years, given the harsh military environments and very wide temperature range of military storage and operational conditions.

6. Unlike liquid reserve batteries, thermal batteries are commonly employed to effectively provide power to munitions within the full military required temperature range of −65 deg. F. to 165 deg. F.

7. In applications in which very short rise times (such as 10 msec) are not required, the thermal management concept with the provision of indicated slow burning fuse ribbon may still be used with or without the piezoelectric element to significantly increase the thermal battery run time.

Both the piezoelectric component of the proposed hybrid power source as well as its safety electronic circuitry and logic may be used as an auxiliary all-fire event detection sensory input for fuzing.

Accordingly, a thermal battery is provided. The thermal battery comprising: a casing; a battery cell disposed in the casing; a pair of electrical leads extending from the casing and electrically connected to the battery cell; a heat generating pyrotechnic material, separate from the battery cell, at least partially surrounding the battery cell; an inertial starter disposed in the casing for at least activating the battery cell upon the casing experiencing a predetermined acceleration event; and insulation disposed between the heat generating pyrotechnic material and the casing.

The heat generating pyrotechnic material can be selected from a group consisting of $Zr/BaCRO_6$, $Fe/KClO_4$ and $Al/Fe_2O_3$.

The thermal battery of claim 1, further comprising a piezoelectric generator having an electrical output upon experiencing the predetermined acceleration event, the electrical output of the piezoelectric generator being electrically connected to an electrical output of the battery cell.

The piezoelectric generator can be disposed in a portion of the casing.

Also provided is a thermal battery comprising: a casing; a battery cell disposed in the casing; a pair of electrical leads extending from the casing and electrically connected to the battery cell; an inertial starter disposed in the casing for activating the battery cell upon the casing experiencing the predetermined acceleration event; insulation disposed between the heat generating pyrotechnic material and the casing; and a piezoelectric generator having an electrical output upon experiencing a predetermined acceleration event, the electrical output of the piezoelectric generator supplementing an electrical output of the battery cell.

The thermal battery can further comprise a heat generating pyrotechnic material, separate from the battery cell at least particularly surrounding the battery cell. The heat generating pyrotechnic material can be selected from a group consisting of $Zr/BaCRO_6$, $Fe/KClO_4$ and $Al/Fe_2O_3$.

The piezoelectric generator can be disposed in a portion of the casing.

Also provided is a method for producing power from a thermal battery having a piezoelectric generator. The method comprising: initiating the thermal battery when the thermal battery experiences a predetermined acceleration event; generating power from the piezoelectric generator when the thermal battery experiences the predetermined acceleration event for at least an initial period after the predetermined acceleration event; and generating power from the thermal battery after the initial period.

BRIEF DESCRIPTION OF THE DRAWINGS

These and other features, aspects, and advantages of the apparatus of the present invention will become better understood with regard to the following description, appended claims, and accompanying drawings where:

FIGS. 3(a) and 3(b) illustrate transient thermal response of the hybrid thermal battery of FIG. 1 without the heating pyrotechnic fuse ribbon being ignited.

FIG. 4 illustrates a thermal battery core temperature following activation vs. elapsed time of the hybrid thermal battery of FIG. 1 without pyrotechnic heat source fuse ignition.

DETAILED DESCRIPTION OF THE PREFERRED EMBODIMENT

As discussed above, following activation upon ignition of its pyrotechnic heat source and melting of the solid electrolyte, a properly designed thermal battery can provide power to an external load as long as its electrolyte stays molten. In a small thermal battery, the latter active time period, i.e., its so-called run time, is relatively short due to their relatively large surface area to volume ratio. To increase the thermal battery run time, an amount of available heat energy needs to be increased. The initial heat energy that can be provided by conventional designs is however limited by the maximum activation temperature that the battery can tolerate, usually at most around 600 deg C., without causing a significant performance degradation.

In the hybrid thermal batteries presented herein, the thermal battery core is packaged with an additional layer of fuse type strips (ribbons) of heat generating pyrotechnic material which are designed to burn at a proper rate to provide a continuous source of heat to the battery core to keep the thermal battery operational during its prescribed run time.

Figure 1:
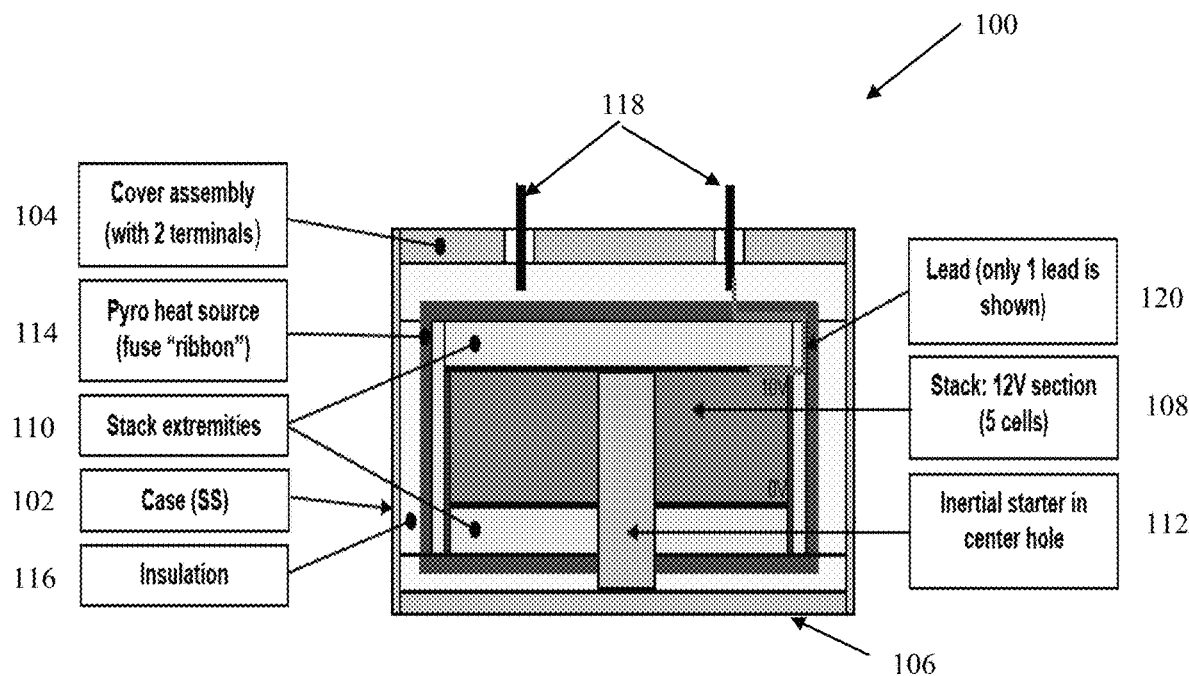
FIG. 1 illustrates an embodiment of a hybrid thermal battery reserve power source.

A hybrid thermal battery is described by way of example that would provide voltage of 5.6 to 12 V; current of 35 mA for 10 sec and then 325 mA from 10 to 200 sec (capacity of 62.1 A sec); and for operation in the indicated launch and spin and temperature environments. The basic design of this hybrid thermal battery and its major components are shown in the schematic of FIG. 1. Such thermal battery, generally referred to by reference numeral 100, includes a case 102, which can be constructed from stainless steel. The case 102 is closed at the top and bottom by a cover assembly plate 104 and a bottom plate 106, each of which can also be constructed from stainless steel. A stack of cells 108 are disposed in the case (such as a stack of 5 cells to make up a 12V section). The stack is surrounded by stack extremities 110, which can be an electrical and/or thermal insulation. An inertial starter 112 is disposed within a central hole in the stack and extremities for initiating the battery cell upon a predetermined acceleration event. A pyrotechnic heat source material 114, such as a pyrotechnic heat source ribbon surrounds one or more surfaces of the battery cell and stack extremities and can surround all portions thereof. The pyrotechnic heat source ribbon can be initiated by the inertial starter 112 for the battery cell 108 or a separate inertial starter (not shown) just for initiation of the pyrotechnic heat source ribbon. Insulation 116 is disposed between the pyro heat source 114 and inner surfaces of the case 102, and top and bottom plates 104, 106. Electrical terminals 118 extend from the top cover 104 and electrically connect, by way of leads 120 to each side of the stack of cells 108 (only one such lead is shown for the sake of simplicity).

Figure 2:
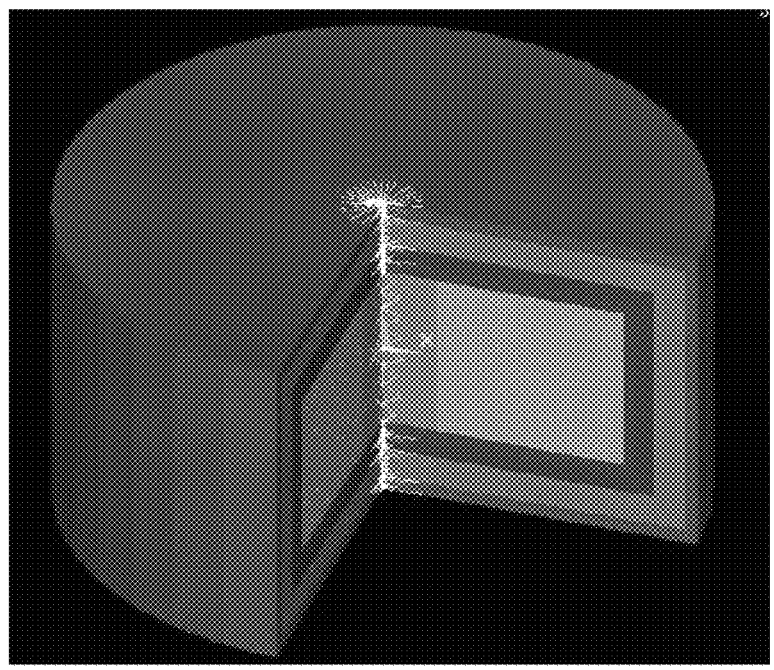
FIG. 2 illustrates a finite element model of the hybrid thermal battery of FIG. 1.
Figure 5A:
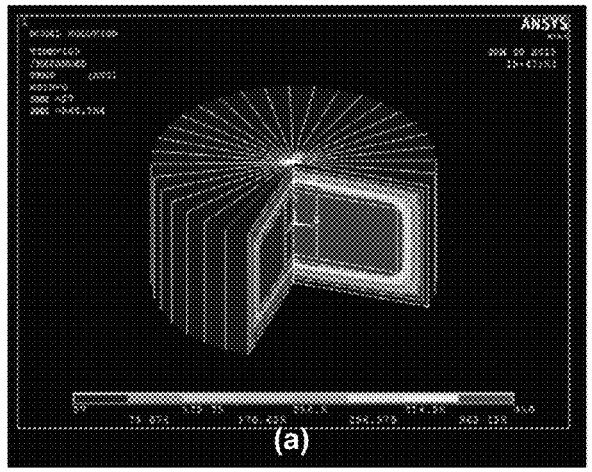
FIGS. 5(a)-5(d) illustrate transient thermal response of the hybrid thermal battery of FIG. 1 with the heating pyrotechnic fuse ribbon ignited and providing a continuous source of heating.
Figure 5B:
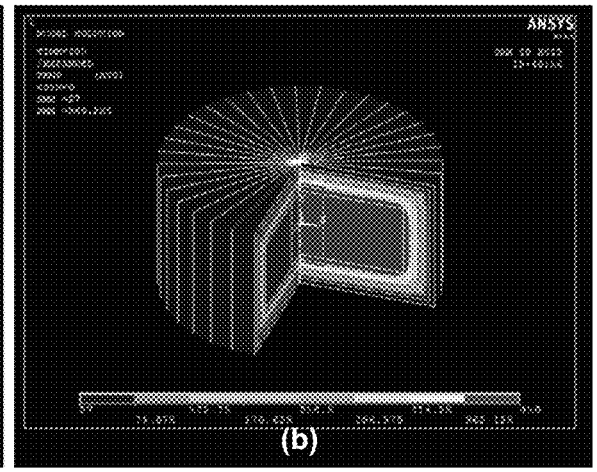
Figure 5C:
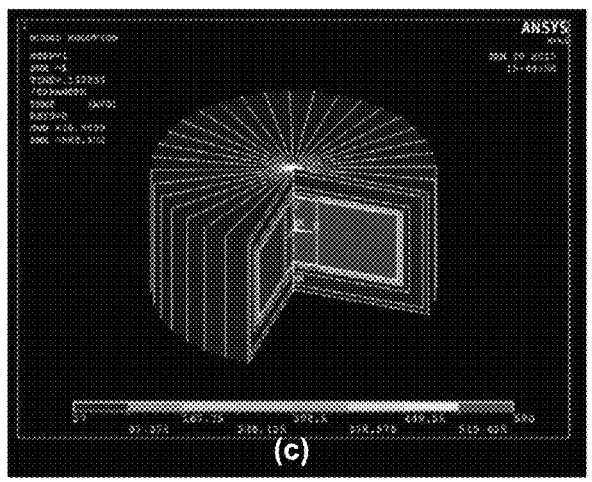
Figure 5D:
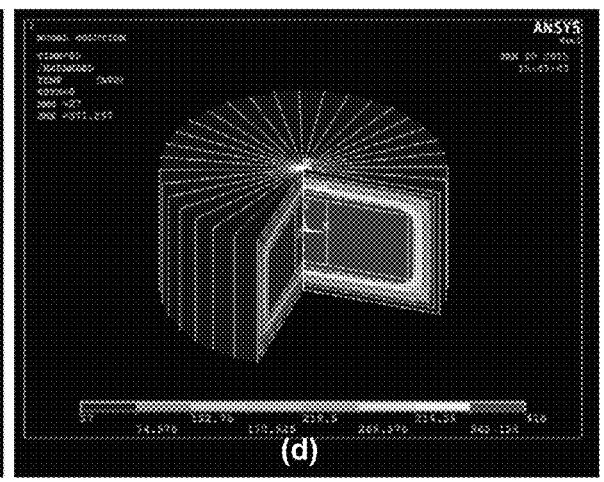

Using Finite Element software, the finite element model of the thermal battery 100 of FIG. 1 with the provided pyrotechnic heat source ribbon 114 was constructed as shown in FIG. 2. The battery used for the finite element model of FIG. 9 has a volume of slightly less than 20 cubic centimeter (a diameter of 3.66 cm and a height of 1.82 cm). Its stainless steel case 102 is 0.031 inch thick. The thicknesses of the outside thermal insulation and the electrical insulation around the battery cell are 0.07 and 0.031 inches, respectively. The thickness of the provided pyrotechnic heat source ribbon 114 is considered to be 0.037 inch. The pyrotechnic heat source ribbon 114 is considered to be wound around the electrical insulation layer as will be described below to allow for its continuous and relatively slow burning over the battery life (e.g., 200 seconds).

The Finite Element software was used to determine the transient response of the thermal battery of FIG. 1 using the finite element model shown in FIG. 2 without and with the provided pyrotechnic heat source ribbons being ignited. The activated battery is considered to be initially at 590 deg. C. and when the temperature of any region of the battery core drops below 360 deg. C., the battery is considered to be deactivated.

Without the pyrotechnic heat source ribbon ignition, the temperature distribution within the thermal battery of FIG. 1 at the time of activation, i.e., at its initial temperature of 590 deg. C.; and after 40 seconds, while its core temperature is just above the battery operational temperature of 360 deg. C., are shown in FIGS. 3(a) and 3(b), respectively. The plot of the lowest battery core temperature (which occurs at the outer top and bottom edges of the battery core) as a function of time (light blue curve) and the core center temperature (dark blue line) are shown in FIG. 4. The plot clearly shows that the thermal battery can stay active, i.e., its core temperature can stay above 360 deg. C. (red line in FIG. 4), for only around 45 seconds, i.e., the run time of this battery is expected to be around 45 seconds.

Next the case in which the pyrotechnic heat source ribbon is ignited is considered as the battery core temperature approaches the lower operational temperature of 360 deg. C. The initial temperature of the battery core is still considered to be 590 deg. C. The temperature distribution within the thermal battery at the time of activation, i.e., its aforementioned initial temperature of 590 deg. C.; after 80 seconds; after 160 seconds; and after 200, while the core temperature is still above the battery operational temperature of 360 deg. C., are shown in FIGS. 5(a), 5(b), 5(c), and 5(d), respectively.

Figure 6:
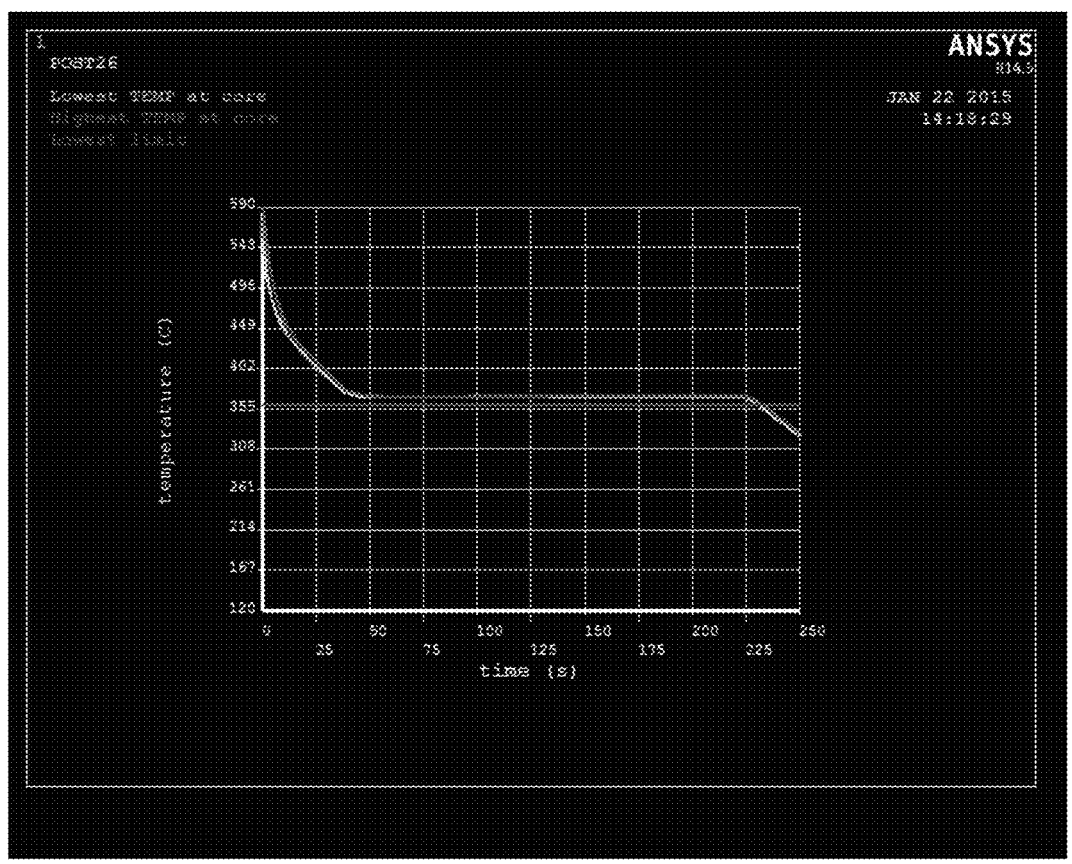
FIG. 6 illustrates a thermal battery core temperature following activation vs. elapsed time for the hybrid thermal battery of FIG. 1 with ignited pyrotechnic heat source fuse elements.

The plot of the lowest battery core temperature (which occurs at the outer top and bottom edges of the battery core) as a function of time (light blue curve) and the core center temperature (dark blue line) are shown in FIG. 6. The plot clearly shows that the thermal battery can stay active, i.e., its core temperature can stay above 360 deg. C. (red line in FIG. 13), well over 200 seconds, i.e., the run time of this battery is expected to be over 200 seconds.

In the above tests, the pyrotechnic material used in the fabrication of the heating pyrotechnic fuse ribbon is considered to provide 800 Cal/cc. In Table 1 below, a number of currently used pyrotechnic materials and their heat generation capacity are provided.

TABLE 1

Pyrotechnic materials or their combination for fuse ribbon.

| Composition | $Zr/BaCRO_6$ | $Fe/KClO_4$ (84%/16%) | $Fe/KClO_4$ (62%/38%) | $Al/Fe_2O_3$ (Thermite) |
|---|---|---|---|---|
| Cal/gr | 390 | 297 | 718 | 939 |
| Cal/cc | 293 | 832 | 1436 | 939 |

In the embodiment discussed above, the thermal battery component is considered to be activated within 50 msec of launch. This means that a piezoelectric component of the power source must be capable of providing the required electrical energy for 40 msec, i.e., starting from an initial time that power is required, e.g., 10 msec after launch to the thermal battery activation, e.g., at 50 msec through the flight. Now considering a typical power requirement, during the 40 msec before the thermal battery is fully operational, the piezoelectric generator has to provide electrical energy in the amount of E=7.84 mJ as shown below:

E=35 mA @ 5.6 V=196 mW for 40 msec;=196 mW×0.040 sec=7.84 mJ

It is also noted that if a typical power requirement profile is considered, the required energy requirement will drop to 0.6 mJ (5 mA @ 3 V=15 mW for 40 msec;=15 mW×0.040 sec=0.6 mJ). Thus, the former electrical energy requirement of 7.84 mJ is considered and if the latter amount of 0.6 mJ is required, one may choose to reduce the size of the piezoelectric element.

Figure 7:
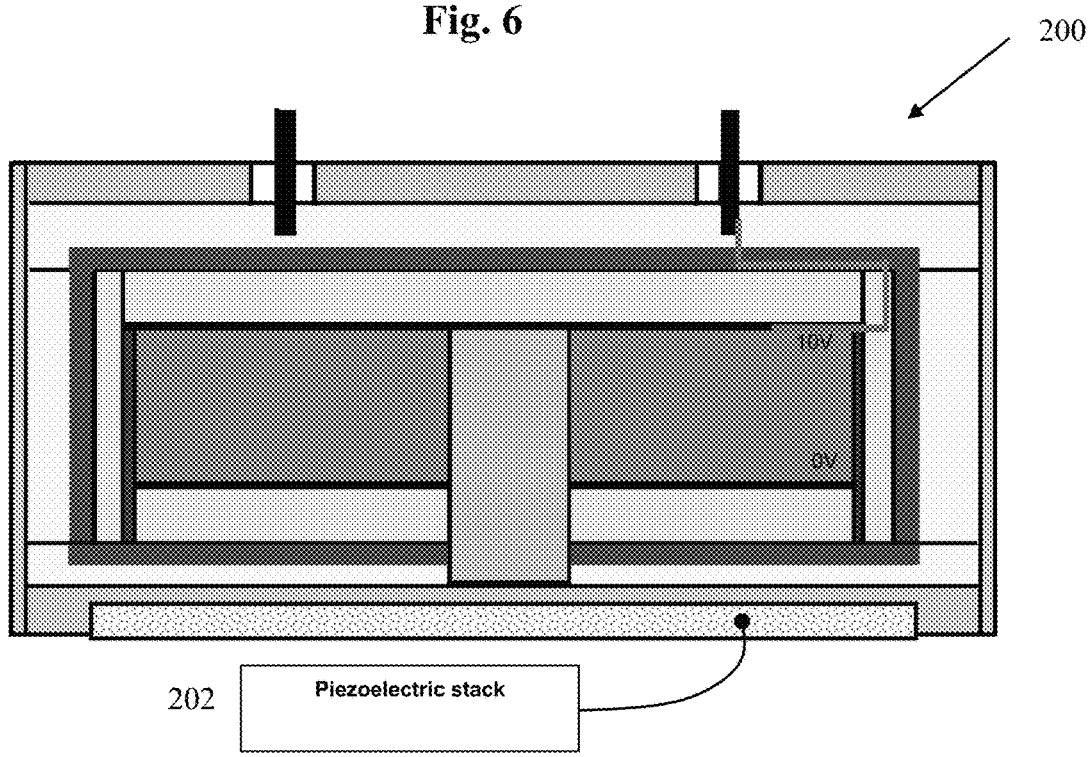
FIG. 7 illustrates a variation of the hybrid thermal battery reserve power source of FIG. 1.
Figure 8:
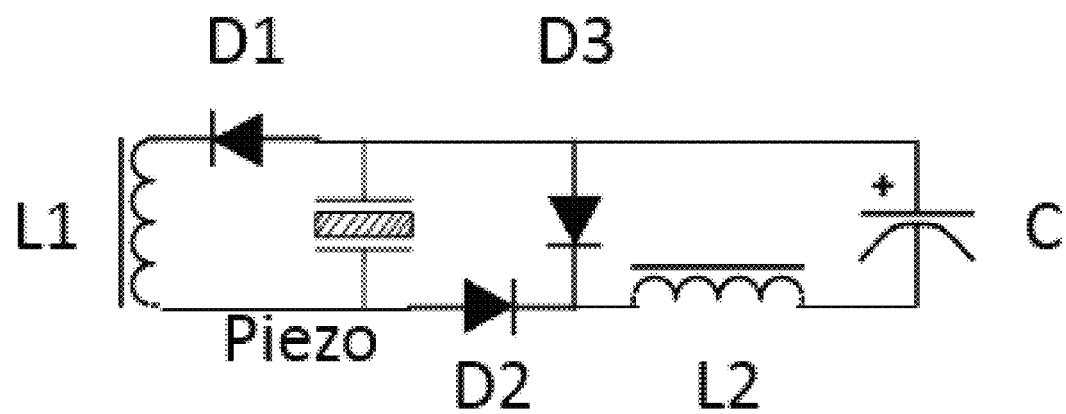
FIG. 8 illustrates charge collection and safety electronics and logic circuitry for the piezoelectric generator in FIG. 7.

In an alternative configuration of a hybrid thermal battery reserve power source, referred to by reference numeral 200, a piezoelectric component 202 is provided, such as being a 1.5 mm thick and 16.8 mm diameter piezoelectric stack element with 6.23 g capacitance (such as those available from Noliac, Inc.), which is mounted in a cavity provided in the bottom 106 of the thermal battery case 102 as shown in the cross-sectional drawing of FIG. 7. All other components of the thermal battery of FIG. 7 are considered to be the same as those described above with regard to FIG. 1. The charge collection and safety electronics and logic circuitry for the piezoelectric generator is shown in FIG. 8. Such circuitry provides the generated piezoelectric charges to storage capacitor which has been shown to have an electrical energy conversion efficiency of over 70% under various simulated setback shock loading conditions. In response to a setback acceleration of around 3,000 Gs, the above piezoelectric element will generate a voltage of around 60 V; which indicates that 11.2 mJ of electrical energy has become available in the piezoelectric capacitance for collection. With the indicated efficiency of 70%, the piezoelectric generator is capable of providing the required 7.84 mJ of electrical energy.

Although the novel methods for thermal batteries with faster rise time and longer run time as disclosed herein is born from the specific needs of munitions, a technology that can reliably provide substantial power in a short amount of time and have a longer run time, particularly in extremely harsh conditions and temperatures will be welcomed in many commercial applications.

One such commercial application is in Automated External Defibrillators (AED) An AED is a portable electronic device that automatically diagnoses life-threatening cardiac arrhythmias in a patient and treat them through defibrillation (the application of metered electrical current to capture the arrhythmia and allow the heart to reestablish an effective rhythm). Use of AED's have become commonplace, mandated in many cases by regulation or policy, and have saved many lives AEDs are often found at public events and government facilities, including shopping centers, airports, restaurants, casinos, hotels, sports stadiums, schools and universities, community centers, fitness centers, health clubs, theme parks, workplaces and any other location where people may congregate. A trend is also developing to purchase and use AED's in the home, particularly by those with known existing heart conditions. AEDs are dependent upon a trickle-charged interior battery that may sit for long periods without ever being used. Maintenance evolutions require that AEDs are periodically checked and batteries replaced—incurring personnel training, material costs, labor costs, and disposal costs. However, a reliable inert battery technology such as the novel thermal battery technology covered herein reduces maintenance burdens and costs as the technology can be unattended without sacrificing reliability. Additionally, application of the thermal batteries disclosed above in AEDs mean that AEDs can be located in locations without AC service to trickle charge AED batteries, including sporting events that do not take place in a stadium, such as at high school sporting events (some states have mandated that an AED be present at all school sporting events) or by emergency workers who need to defibrillate a patient in remote areas.

Another commercial application is for backup emergency engine starting. Combustion engines are particularly dependent on batteries for starting. Engines performing critical functions, such as marine propulsion, heavy equipment, compressors, water pumps, aircraft, trucks, military vehicles, emergency service vehicles and automobiles would benefit from a reliable, unattended backup emergency power source to provide emergency starting power when conventional means are not available. Particularly in severe and inclement conditions, such as wet and icing conditions, the thermal battery technology discussed above would find application.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A thermal battery comprising:

a casing;

a battery cell disposed in the casing, the battery cell comprising a stack of cells;

a pair of electrical leads extending from the casing and electrically connected to the battery cell;

a heat generating pyrotechnic material, separate from the battery cell, at least partially surrounding the battery cell;

an inertial starter disposed within a hole in the stack of cells for at least activating the battery cell upon the casing experiencing a predetermined acceleration event; and insulation disposed between the heat generating pyrotechnic material and the casing.

2. The thermal battery of claim 1, wherein the heat generating pyrotechnic material is selected from a group consisting of $Zr/BaCRO_6$, $Fe/KClO_4$ and $Al/Fe_2O_3$.

3. The thermal battery of claim 1, further comprising a piezoelectric generator having an electrical output upon experiencing the predetermined acceleration event, the electrical output of the piezoelectric generator being electrically connected to an electrical output of the battery cell.

4. The thermal battery of claim 3, wherein the piezoelectric generator is disposed in a portion of the casing.

5. A thermal battery comprising:

a casing;

a battery cell disposed in the casing, the battery cell comprising a stack of cells;

a pair of electrical leads extending from the casing and electrically connected to the battery cell;

an inertial starter disposed within a hole in the stack of cells for activating the battery cell upon the casing experiencing the predetermined acceleration event;

insulation disposed between the heat generating pyrotechnic material and the casing; and a piezoelectric generator having an electrical output upon experiencing a predetermined acceleration event, the electrical output of the piezoelectric generator supplementing an electrical output of the battery cell.

6. The thermal battery of claim 5, further comprising a heat generating pyrotechnic material, separate from the battery cell at least particularly surrounding the battery cell.

7. The thermal battery of claim 6, wherein the heat generating pyrotechnic material is selected from a group consisting of $Zr/BaCRO_6$, $Fe/KClO_4$ and $Al/Fe_2O_3$.

8. The thermal battery of claim 5, wherein the piezoelectric generator is disposed in a portion of the casing.

9. The thermal battery of claim 1, wherein the inertial starter is disposed coincident with a central axis of the battery cell.

10. The thermal battery of claim 5, wherein the inertial starter is disposed coincident with a central axis of the battery cell.

* * * * *